United States Patent

Makabe

[15] 3,666,651
[45] May 30, 1972

[54] pH MEASURING COMBINED ELECTRODE

[72] Inventor: Hirokuni Makabe, Higashimurayama, Tokyo, Japan

[73] Assignee: Toa Electronics Limited, Tokyo, Japan

[22] Filed: June 30, 1969

[21] Appl. No.: 837,440

[30] Foreign Application Priority Data

July 2, 1968    Japan.................................43/55658

[52] U.S. Cl. ......................................................204/195 G
[51] Int. Cl. ...............................................................G01n 27/36
[58] Field of Search............................................204/1 T, 195

[56] References Cited

UNITED STATES PATENTS

| | | | |
|---|---|---|---|
| 2,311,977 | 2/1943 | Coleman | 204/195 |
| 2,383,450 | 8/1945 | Coleman | 204/195 |
| 2,755,243 | 7/1956 | Beckman et al. | 204/195 |
| 2,844,532 | 7/1958 | White et al. | 204/195 |
| 3,324,013 | 6/1967 | Dewing | 204/17 |
| 3,399,667 | 9/1968 | Nishimoto et al. | 204/195 |
| 3,434,953 | 3/1969 | Porter et al. | 204/195 |

*Primary Examiner*—T. Tung
*Attorney*—William J. Daniel

[57] ABSTRACT

A pH measuring combined electrode including a glass electrode, a reference electrode and a thermosensitive resistance element for temperature compensation integrated into a compact miniaturized assembly. At least the inner electrode of the glass electrode is constituted by a glass-coated lead-in wire and the thermosensitive resistance element is arranged in direct proximity to the inside wall of the pH sensitive glass membrane of the glass electrode. A guard ring is preferably provided around an electrode supporting tube to assist in maintaining clearance between the lead-in wires at their juncture with the electrode assembly.

3 Claims, 6 Drawing Figures

Patented May 30, 1972 3,666,651
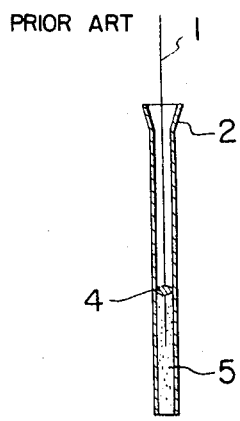
FIG. 1
PRIOR ART
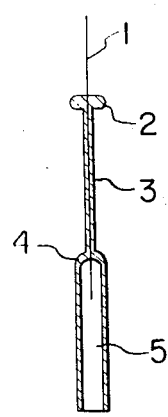
FIG. 2
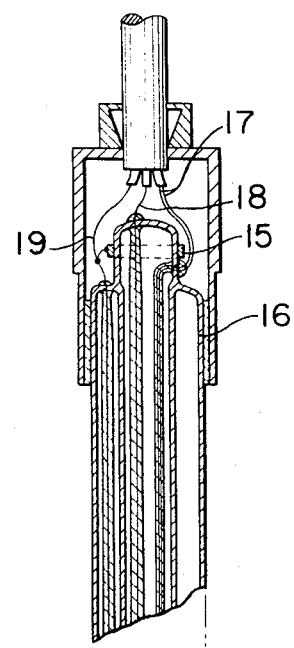
FIG. 6
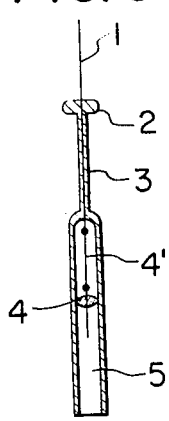
FIG. 3
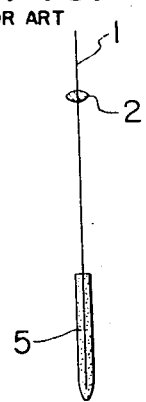
FIG. 4
PRIOR ART
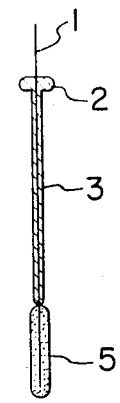
FIG. 5
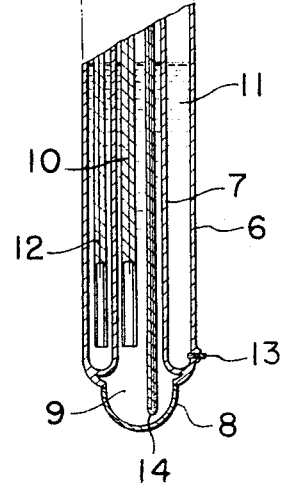

MEASURING COMBINED ELECTRODE

The present invention relates to a combined electrode for pH measurement.

It is known to use a combined electrode consisting of a pH sensitive electrode (glass electrode) and a reference electrode for measuring pH-values of solutions. The constituent arts of such a combined electrode have a certain limit in dimension; inner electrodes, lead-in wires of said electrodes, inner solution and a liquid junction must be confined in a small space. Therefore, glass working to make a combined electrode encounters many difficulties. Especially, it is very difficult for glass working technology to seal two tubular inner electrodes in an insulating glass stem.

pH measuring combined electrodes hitherto known comprise only a glass electrode and a reference electrode. A combined electrode including a thermosensitive resistance element such as thermistor for temperature compensation as well as both electrodes has not yet been developed. The reason therefor is that it is quite difficult to seal many electrodes and their lead-in wires in an insulating glass stem with necessary strength and sufficient insulation across wires. In addition, the lead-in wires of the glass electrode and the thermosensitive element for temperature compensation must be insulated from each other with at least $10^{11}$ $\Omega$ or more. However, when these lead-in wires are taken out through the narrow sealed portion on the top of the stem, no sufficient insulation can be kept because of surface leakage, thus making measured values unstable.

An object of the present invention is to provide a small-sized, easily manufacturable and stable combined electrode for pH measurement in which the lead-in wires of inner electrodes are coated with glass.

Another object of the present invention is to provide a highly stable and accurate combined electrode for pH measurement which consists of a glass electrode having an inner electrode, a reference electrode and a thermosensitive resistance element for temperature compensation and which is capable of measuring especially a small amount of solution to be measured with ease.

In the accompanying drawing:

FIGS. 1 and 4 show prior art inner electrodes of the type used in conventional pH measuring combined electrodes;

FIG. 2, 3 and 5 are sectional views of inner electrodes according to the present invention; and FIG. 6 is a sectional view of a combined electrode comprising inner electrodes according to the present invention.

Referring to FIG. 1, a conventional tubular inner electrode with flare type sealing portion 2 is sealed generally through the following procedures: A lead-in wire 1 is held in the center of a glass tube and sealed-in at 4 by fusion, The lower room 5 thus defined is filled with mercury and calomel. Then this inner electrode is adhered to the upper end of a supporting glass tube at the flared portion 2. The supporting glass tube of a combined electrode is double-walled, i.e., comprises an inner and an outer glass tube, and one electrode must be enclosed in each of the glass tubes. In this case, the inner and outer glass tubes and the two electrodes must be adhered together at the upper ends. It follows that one electrode is initially sealed in the inner supporting tube in the above-mentioned way, then another electrode is enclosed in the outer supporting tube and finally the inner supporting tube with the inner electrode and the outer supporting tube with the reference electrode are adhered together at the upper ends. However, as stated before, a limit is set to the dimension of a complete electrode. When supporting glass tubes and electrode tubes are made very small in diameter, it is very difficult to seal them together without changing their original forms, for they may stick to one another at any other point than necessary or may be deformed by thermal expansion of the internal air.

To overcome these difficulties, an electrode without glass tube, as shown in FIG. 4, was already made, in which mercury, calomel or silver chloride was deposited at 5 on one end of a bare lead-in wire 1. This lead-in wire was confined in an insulating glass tube and sealed-in at a bead 2. In this construction, when the inner solution comes into contact with the bare lead-in wire, the electrode potential will be unstable, thus many cause errors of measurement.

FIGS. 2, 3 and 5 show some emboidments of the present invention. Numeral 3 designates the part of a lead-in wire coated with glass. This is made by inserting a lead-in wire 1 into a thin glass tube and pinch-sealing it with a burner. A glass bead 2 provided at the upper end of the glass coat is intended for sealing an insulating glass tube.

The inner electrodes in FIGS. 2 and 3 are of the filler type wherein the exposed part of the lead-in wire extending from the lower end of the glass coated part thereof is covered with a glass tube 5 and the lower end of the glass coat is adhered to the upper end of the glass tube 5 to define a filling space.

In FIG. 3, a part of the lead-in wire is made of, for example, silver. This part is held in a tube 4' and the tubes 4' and 5 are adhered at 4. This construction has an advantage that a metal wire having a expansion coefficient different from glass can be used in the tube 4'.

FIG. 5 is an example of application of the invention to the electroplated type inner electrode. The exposed part of the lead-in wire extending from the lower end of the glass-coated part is coated with calomel or silver chloride by any electroplating method. This inner electrode can be made especially small, so that it is useful for manufacture of a combined electrode.

Thus, with these inner electrodes, a pH measuring combined electrode, restricted in size and complicated in construction, can be not only made small, but also stabilized in potential and improved in workability.

An inner or reference electrode wherein its lead-in wire is coated with glass and a glass bead at the upper end of the glass coated part is intended for adhesion to an insulating tube has been hereinbefore explained. With the help of this bead, scaling of the combined electrode can be easily and perfectly effected.

An embodiment of a combined electrode according to the present invention will be now explained referring to FIG. 6. Numerals 6 and 7 designate insulating glass tubes for supporting inner electrodes. They are adhered to each other at the upper and lower ends. An electrode membrane 8 of pH sensitive glass is adhered to the lower end of the integrated supporting tube. An inner electrode 10 and inner solution are enclosed in the inner space 9 of the glass tube 7 and a reference electrode 12 is confined in a space 11 defined by the glass tubes 6 and 7. Arranged at the lower end of the space 11 is a liquid junction 13. Further, a thermosensitive resistance element for temperature compensation 14 extends in the space 9 down to be close to the inner wall of the glass membrane 8. The element 14 and their two lead-in wires are sealed in a thin glass tube for protection against contact with the inner solution. These lead-in wires and those of the glass and reference electrodes are coated with glass by inserting them into thin glass tubes and pinch-sealing the tubes by heat, thereby to reinforce the wires to support the inner elements and at the same time to keep insulation between wires. As the thermosensitive resistance element 14 is arranged quite close to the inner wall of the glass membrane 8, the temperature of the electrode necessary for temperature compensation can be detected most exactly, thus improving remarkably the measuring accuracy.

To prevent leakage current across the lead-in wire 18 of the inner electrode and those of the thermosensitive resistance element, the insulating tube 7 extends upwardly from the tube 6 and a guard ring 15 made of metal foil or conductive coating material is provided around the projecting part of the tube 7. The lead-in wire 19 of the reference electrode 12 is connected to the guard ring 15. 16 is a cap for protecting the connections of the lead-in wires 17 are lead-in wires of the temperature compensation circuit of the glass electrode.

What is claimed is:

1. A slender compact composite pH measuring electrode comprising an inner elongated glass tube (7) formed at least at the lower end thereof as a glass membrane (8) of pH sensitive glass and containing an inner solution (9); an outer glass tube (6) surrounding said inner tube over at least the major length thereof and in sealed connection therewith adjacent its ends to define with the inner tube an annular space (11) for containing a reference solution isolated from said inner solution, said outer tube carrying a liquid junction (13) for the sample medium to be tested; a reference electrode (12) and an inner electrode (10) extending longitudinally within the respective annular space and inner tube, each of said electrodes comprising an electrode lead wire (18,19) having a lower electrode end portion with the remainder of its length within the respective said annular space and the said inner tube surrounded by a directly contacting thin glass envelope (3), the upper end of each of said envelopes being formed as a bead (2) and fused in sealing relation with the upper end of the corresponding tube (6, 7) to maintain the corresponding electrode in place with the lead wires (18,19) projecting from said seals for connection to an electrical potential; and a thermosensitive element (14) extending longitudinally of said inner tube in proximity to the inner surface thereof, said element being sealed throughout its length within a directly contacting thin glass envelope, the upper end of said element envelope being sealed to the upper end of said inner tube (7) in spaced relation to the sealed upper end of said glass electrode with the lead wire thereto projecting from said seal.

2. The composite electrode of claim 1 wherein said inner tube is provided with an extension projecting beyond its connection with said outer tube (6), the envelope end of said inner electrode being sealed to the extreme end of said extension the envelope end of the reference electrode being sealed to the top of said outer tube, and the envelope end of the said element being sealed to the side of said extension to maintain the lead wires spaced apart.

3. The composite electrode of claim 2 wherein a guard ring is mounted on said extension in non-contacting relation to the lead wires projecting therefrom and the lead wire to said reference electrode projecting from the upper end of said outer tube is attached to said guard ring to prevent contact between the reference electrode lead wire and the other lead wires.

* * * * *